United States Patent
Lopez

(10) Patent No.: US 6,854,741 B2
(45) Date of Patent: Feb. 15, 2005

(54) UNIVERSAL COLLECT ADAPTER TOOL

(76) Inventor: Robert Henry Lopez, 3314 Holly Dr., San Jose, CA (US) 95127

( * ) Notice: Subject to any disclaimer, the term of this patent is extended or adjusted under 35 U.S.C. 154(b) by 41 days.

(21) Appl. No.: 10/602,300

(22) Filed: Jun. 24, 2003

(65) Prior Publication Data

US 2004/0262857 A1 Dec. 30, 2004

(51) Int. Cl.$^7$ ............................................. B23B 31/120
(52) U.S. Cl. ............................. 279/52; 279/145; 279/51
(58) Field of Search ............................... 279/43.1, 43.2, 279/43.8, 46.3, 51, 52, 53, 143, 145

(56) References Cited

U.S. PATENT DOCUMENTS

| | | | | |
|---|---|---|---|---|
| 1,125,780 A | * | 1/1915 | Waite | 279/51 |
| 2,291,397 A | * | 7/1942 | Martin | 279/51 |
| 2,291,398 A | * | 7/1942 | Martin | 279/51 |
| 2,478,195 A | * | 8/1949 | Hull | 279/145 |
| 2,769,644 A | * | 11/1956 | Denzler | 279/51 |
| 3,411,796 A | * | 11/1968 | Decker | 279/46.4 |
| 3,874,688 A | * | 4/1975 | Schiller | 279/50 |
| 4,477,095 A | * | 10/1984 | Atkinson, III | 279/145 |
| 4,762,447 A | * | 8/1988 | Marantette | 409/131 |
| 5,077,876 A | * | 1/1992 | McConkey | 29/27 R |
| 5,403,132 A | * | 4/1995 | Truesdell | 409/131 |
| 5,772,219 A | * | 6/1998 | Vossen | 279/156 |
| 5,957,636 A | * | 9/1999 | Boisvert | 409/131 |

FOREIGN PATENT DOCUMENTS

EP 69194 A2 * 1/1983 ........... B23B/31/20

* cited by examiner

*Primary Examiner*—Daniel W. Howell
*Assistant Examiner*—Michael W. Talbot

(57) ABSTRACT

A one-piece constructed adapter collet tool, for adapting a smaller standard collet to a standard oversized spindle on a machine tool. Said one-piece constructed adapter collet having an external configuration constructed to mate said oversized standard spindle configuration, and an internal configuration constructed to mate with said smaller standard collet configuration. Said adapter collet is constructed with external threads for the purpose of engaging the draw spindle or draw spindle adapter internal threads. Said adapter collet is constructed with an external keyway to work in conjunction with said spindle pin on a machine tool. Said adapter collet is constructed with internal threads for the purpose of engaging said standard smaller collet external threads. Said adapter collet will have a setscrew compressing on said standard collet threads this action will fix the rotation of said standard collet. Activation of said adapter collet compression function is accomplished by the draw of the adapter collet via the draw spindle or draw spindle adapter, said draw action will compress the adapter collet mating tapered surface via said standard spindle tapered surface. Said compression function also compresses the internal tapered surface of said adapter collet thus compressing said standard collet mating tapered surface thus compressing, holding any parts with said standard collet.

1 Claim, 2 Drawing Sheets

UNIVERSAL COLLECT ADAPTER TOOL

BACKGROUND OF THE INVENTION

The machine tool industry uses machines such as lathes, chucking machines, and the like are available. These machines have a significant variety of spindle sizes and capacity. The spindle sizes available depend to some extent upon the manufacturer of the machines. A number of different standard size spindles are used.

For example, a SC is a rather common size collet—spindle for a number of different machines. Another larger spindle is the American National Standard Institute (ANSI) A2-5 spindle, which may be made to accept the larger 16C collets, but also said spindles may require the use of a smaller SC collets. Thus, the collet adapter of the present invention permits use of the smaller collets on the larger size spindle machines.

The prior art reveals an adapter also intended for adapting a smaller collet to a large spindle. U.S. Pat. No. 4,477,095 disclosers such an adapter which allows the use smaller collets in machines with larger collet seats. These units are available when you do not have the proper size standard collet for the machine but do have the proper size in a smaller style collet. However this prior structure suffers from several disadvantages. Specifically, this unit has many moving parts, and is not to be considered when doing precision work. Because of the number of parts in the assembly, the TIR of the machined diameters to the chucked diameters may be unacceptable. Said adapter includes a tapered head portion engaged with a threaded tubular portion, held in by a faceplate and screws. The tubular portion external threads engage the drawtube, on its exterior surface and threads receives the smaller diameter on its interior surface. Said unit can only be used on specific manufactures machines. It will take 15–30 minutes to change the adaptor.

The prior art reveals an adapter also intended for adapting a smaller collet to a larger spindle. U.S. Pat. No. 2,478,195 disclosers such an adapter that includes a tapered head portion slideably engaged with a threaded tubular portion. The tubular portion in turn threads engages the drawtube of the machine tool on its exterior surface and threads receives the smaller diameter on its interior surface. However this prior structure suffers from several disadvantages. Specifically, upon release of the draw tube for releasing the work, the adapter is just as likely to push out with its head pressure on the work piece, in addition the connection between the head portion and the tubular portion of this adapter is such that significant wear can result between the two pieces which in turn can reduce the accuracy of the machine tool The primary object of the present invention is to provide an improved collet adapter for adapting a smaller collet of a given size to a larger size machine tool spindle. A further object of the invention is to provide a one-piece collet adapter of improved construction, which can be used in any standard collet chuck or spindle.

BRIEF SUMMARY OF THE INVENTION

This invention relates to a one piece constructed collet adapter, and in particular an adapter for use with a oversized spindle on a machine tool which is designed to accept a specific larger standard size collet, wherein the user wishes to use a smaller standard collet of lesser capacity. Said one-piece collet adapter compression, holding function is accomplished by the tapered angular construction of the standard spindle configuration and the tapered angular construction of the standard collet configuration, via draw of the drawtube or drawtube adapter.

DETAIL DESCRIPTION OF THE INVENTION

Figure 1:
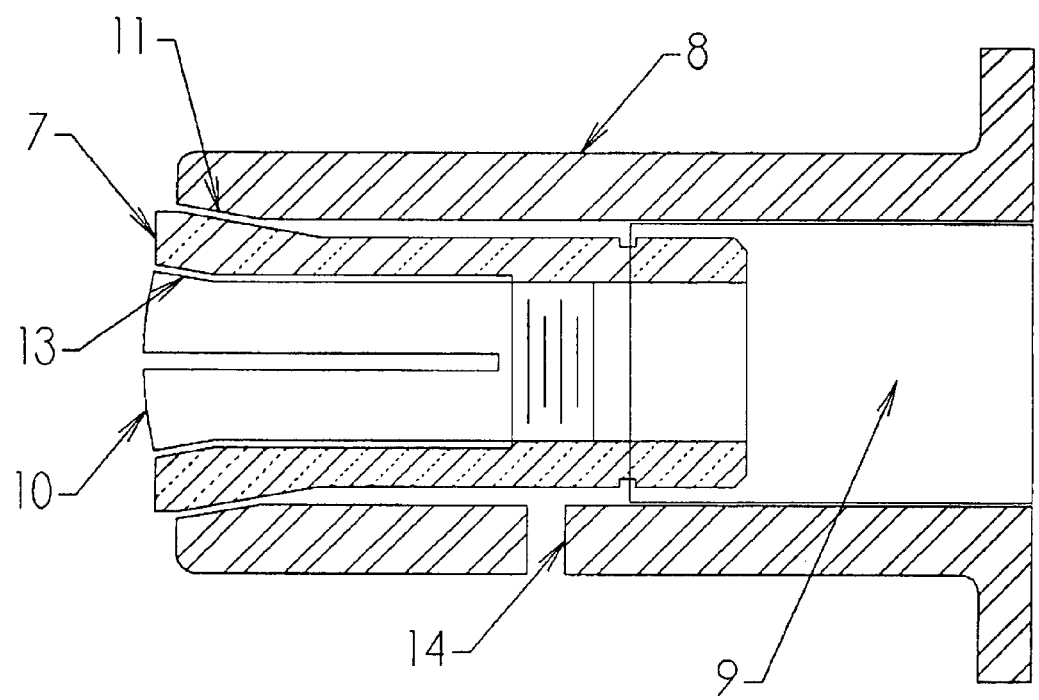
FIG. 1 is a longitudinal cross section of the collet adapter tool of this invention, with a smaller collet inserted, mounted within the spindle or collet chuck and engaging the draw spindle.
Figure 2:
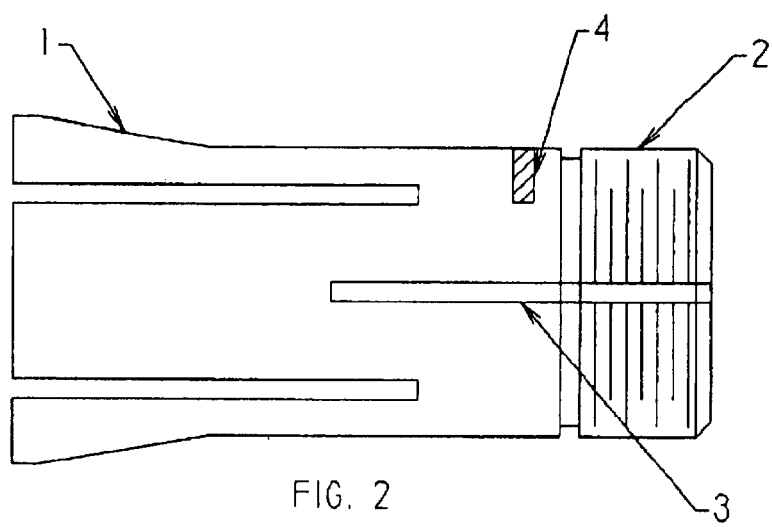
FIG. 2 collet adapter tool of the present invention.
Figure 3:
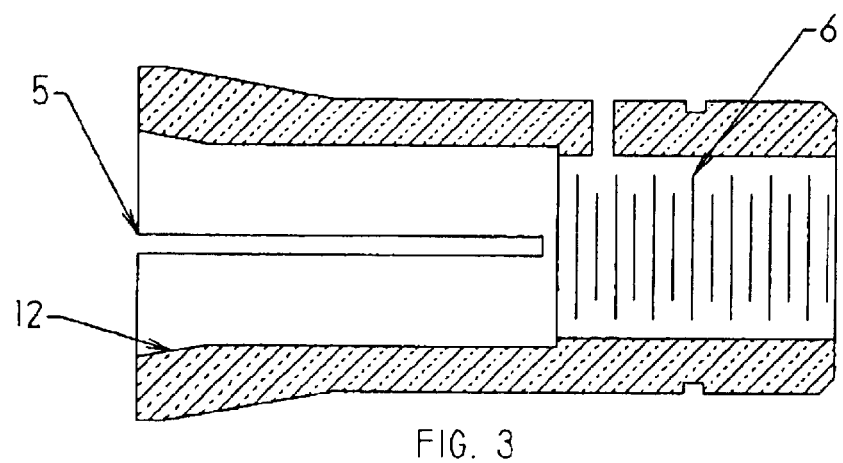
FIG. 3 is a longitudinal cross section of the collet adapter of the present invention.

Referring to FIG. 1, a machine tool spindle, or collet chuck 8 is of substantially conventional construction, and as such includes the standard tapered surface 11. The collet adapter 7 is inserted into the spindle or collet chuck 8. Said collet adapter is externally threaded 2—FIG. 2, engaging the internal threads of said draw spindle or draw spindle adapter 9 a conventional collet actuating mechanism. Said collet adapter tapered surface 1—FIG. 2 is configured so as to mate said spindle or collet chuck 8, tapered surface 11. Said collect adapter is internally threaded to engage with the externally threads of said standard collet 10. Said collet adapter internal tapered surface 12—FIG. 3 is configured to mate said standard collet 10 tapered surfaces 13. Said machine tool spindle 8 of conventional construction will have a pin 14 working in conjunction with the keyway 3—FIG. 2 of the adapter collet. Activation of said compression function is accomplished by the draw of the adapter collet 7 via the drawtube 9, the draw of said adapter collet will compress its tapered surface 1 FIG. 2 via said mating spindle 8 standard tapered surface 11, compressing said adapter collet 7 inside tapered surface 12—FIG. 3 activating compression on said smaller standard collet 10 tapered surface 13 activating compression, holding parts within said smaller standard collet 10.

Referring to FIG. 2, said collet adapter tapered surface 1 is configured to mate said spindle or collet chuck 8—FIG. 1, tapered surface 11—FIG. 1. Said collet adapter is externally threaded 2 so as to engage the internal threaded draw spindle or draw spindle adapter 9—FIG. 1 of a conventional collet actuating mechanism. Said collet adapter is provided with a keyway 3 so positioned as to be axial aligned when the collet is tightened, in conjunction with the constructed pin of a standard spindle or collet chuck. A setscrew 4 is provided in said collet adapter to engage the threads of said smaller collet 10—FIG. 1 and prevent relative rotation of said smaller collet within the collet adapter.

Referring to FIG. 3, said standard smaller collet 10 FIG. 1 is of substantially conventional construction, and as such includes the usual tapered clamping surface 13 FIG. 1. Said smaller collet is inserted into said collet adapter. Said collet adapter is internally threaded 6 to engage said smaller collets external threads. Said collet adapter internal tapered surface 12 is configured to mate the external tapered configuration of said smaller collet 13—FIG. 1. Said collet adapter contains relief slits 5 to allow a compression function on said smaller collets. Said compression function is accomplished by the draw of said collet adapter 7—FIG. 1 via the drawtube 9—FIG. 1, this action will draw said adapter collet tool pressing its tapered surface 1—FIG. 2 into said mating spindle tapered standard surface 11—FIG. 1, compressing said adapter collet which will compress said tapered angle 12—FIG. 3 on said smaller collet 10—FIG. 1 tapered angler surface 13—FIG. 1 which will compress and hold parts needing machining.

What I claim as my invention is:

1. A one-piece constructed tool for adapting a standard smaller collet to an oversized spindle, or collet chuck on a machine tool, comprising:
   (a) a adapting collet tool having an external configuration sized to mate with said oversized spindle configuration and an internal configuration sized to mate with said standard collet, said adapting collet tool having a forward and rearward end;
   (b) said configuration of adapter collet tool will mate internally to said spindle configuration, engaging said draw spindle, and said smaller collet will mate internally within matching configuration of said adapter collet tool;
   (c) said adapter collet tool having an external annular tapered surface on the forward end, said annular tapered surface is configured and constructed to mate the oversized spindle or collet chuck configuration;
   (d) said adapter collet tool having an internal annular tapered surface on the forward end, said annular tapered surface is configured and constructed to mate said smaller collet configuration;
   (e) said adapter collet tool having external threads on the rearward end, said threads is configured and constructed to mate with said draw spindle of a conventional collet actuation mechanism;
   (f) said adapting collet tool having internal threads on the rearward end, said threads is configured and constructed to mate with said smaller collet configuration;
   (g) said smaller collect is additional held in place by the adapter collet tool set screw compressing on said smaller collect external threads to prevent rotation;
   (h) a compression function is accomplished by the draw of the adapter collet tool via the draw spindle or draw spindle adapter;
   (i) said draw action will draw said adapter collet tool into said spindle compressing the adapter collet tool tapered surface via said mating spindle angular tapered surface;
   (j) said compression of the adapter collet tool will active a compression function onto said mating smaller collet angular tapered surface;
   (k) said compression on said smaller standard collet will compress and hold parts needing machining.

* * * * *